UNITED STATES PATENT OFFICE.

JOHN A. JUST, OF SYRACUSE, NEW YORK.

PROCESS OF MAKING LACTOSE FROM GLUCOSE.

No. 851,673.        Specification of Letters Patent.        Patented April 30, 1907.

Application filed November 21, 1906. Serial No. 344,355.

*To all whom it may concern:*

Be it known that I, JOHN A. JUST, a citizen of the United States, and a resident of Syracuse, New York, have invented certain new and useful Improvements in Processes of Making Lactose from Glucose, of which the following is a specification.

This invention relates to a process of making lactose from glucose and the best mode of operation is substantially as follows:

I have discovered that an extract of mammary gland contains a substance which has the power to convert glucose in solution to lactose, which may be precipitated from the solution by alcohol or in any other known way. The lactose or milk sugar may be taken up by alkalies and the milk sugar separated. I have also discovered that the conversion of glucose to lactose goes on in the presence of the alcoholic fermentation to a certain extent in the glucose and if this can be carried on to such an extent that there is sufficient alcohol, the lactose formed will be precipitated by the alcohol.

Extract of mammary gland may be used or the fresh gland may be minced in small pieces and the conversion should be carried on at a suitable temperature. The extract of mammary gland may be prepared in several ways, the object being to obtain the active principle in solution. The mammary glands are preferably of full grown animals with all functions at their maturity. From the fresh gland free from blood the juice may be pressed by means of high pressure in a hydraulic press for instance, and this juice used as the ferment. A pressure of about 300 atmospheres will yield the richest substance for the purpose, or else a nearly saturated salt solution may be used to extract the substance. Glycerin will also extract it.

A suitable temperature for the conversion is from about 80 to about 105 degrees F. Excess glucose may be subjected with mammary gland to alcoholic fermentation to precipitate the lactose formed, for alcohol precipitates the lactose and not the glucose. The solutions should be of such strength that the operation will not be interrupted owing to an excess of glucose and so that no glucose will remain in excess after the alcoholic fermentation is completed. In case some glucose remains on completion of the operation, the lactose formed in solution may be precipitated by adding alcohol without interfering with the small amount of glucose left since lactose is insoluble in alcohol and glucose soluble in alcohol. Both of these are soluble in water and may be separated.

The lactose may be precipitated as fast as it is formed by the newly formed alcohol. The alcoholic fermentation may be checked at any time and at any stage of the process by subjecting the fermenting mass to a pressure of about four atmospheres of $CO_2$. This $CO_2$ may be allowed to accumulate from the fementation if desired, and the vessel in which the operation is carried on may be so constructed that it may be shut off tightly to allow the pressure of $CO_2$ to rise to the desired degree, thereby checking the gaseous and alcoholic fermentation but allowing the fermentation of lactose to continue. The precipitate of lactose obtained is very pure, but may be further purified by crystallization. The lactose may be taken up by alkalies and the corresponding alkali salt of lactose decomposed by $CO_2$ or other suitable acid to separate the milk sugar. The reaction probably is $$2C_6H_{12}O_6 = C_{12}H_{22}O_{11} + H_2O.$$

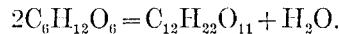

Two molecules of glucose give one molecule of milk sugar and one molecule of water.

As an example of the carrying out of the process, a standard strength extract may be prepared from the expressed juice of the mammary glands, and a pint of such standard solution may be added to one thousand pounds of a six or ten per cent. sugar solution.

I claim and desire to obtain by Letters Patent the following:

1. The process substantially as herein described of making lactose from glucose, which consists in treating a solution of glucose with the active principle of mammary gland, which converts the glucose into lactose.

2. The process substantially as herein described of making lactose from glucose, which consists in treating a solution of glucose with an extract of mammary gland.

3. The process substantially as herein described of making lactose from glucose, which consists in treating a solution of glucose with the juice of mammary gland at a suitable temperature.

4. The process substantially as herein described of making lactose from glucose, which consists in treating a solution of glucose with the juice of mammary gland at a suitable temperature and then separating the lactose from the solution.

5. The process substantially as herein described of making lactose from glucose, which consists in treating a solution of glucose with the juice of mammary gland at a temperature of about 80 to about 105 degrees F.

In testimony whereof I have signed this specification in the presence of two subscribing witnesses.

JOHN A. JUST.

Witnesses:
OLIN A. FOSTER,
A. K. SCHNEIDER.